United States Patent
Fusaro, Jr.

(10) Patent No.: US 6,374,158 B1
(45) Date of Patent: Apr. 16, 2002

(54) ROBOTIC LASER POINTER

(75) Inventor: Robert Anthony Fusaro, Jr., Cobleskill, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/504,196

(22) Filed: Feb. 15, 2000

(51) Int. Cl.$^7$ ............................................. G05B 19/04
(52) U.S. Cl. ................ 700/254; 700/245; 700/253; 700/255; 700/257; 700/251; 700/264; 700/259; 700/256; 318/568.13; 318/568.14; 318/568.15; 318/568.16; 219/125.11; 219/125.12
(58) Field of Search .................. 700/69, 71, 88, 700/112, 161, 193, 194, 245, 247, 251, 253, 255, 256–259, 264; 318/568.23, 568.13–568.16, 568.21, 528, 571; 701/2; 219/124.33, 124.34, 86.41, 125.11, 125.12; 90/3, 42, 9; 242/354.2; 436/48

(56) References Cited

U.S. PATENT DOCUMENTS

| | | | | |
|---|---|---|---|---|
| 4,011,437 A | * | 3/1977 | Hohn ..................... | 318/568.23 |
| RE30,016 E | * | 5/1979 | Hohn ......................... | 700/253 |
| 4,260,941 A | * | 4/1981 | Engelberger et al. .. | 318/568.23 |
| 4,275,986 A | * | 6/1981 | Engelberger et al. ....... | 414/730 |
| 4,367,532 A | * | 1/1983 | Crum et al. ........... | 318/568.24 |
| 4,442,387 A | * | 4/1984 | Lindbom ................ | 318/568.13 |
| 4,447,697 A | * | 5/1984 | Dunne et al. ............ | 219/86.41 |
| 4,675,502 A | * | 6/1987 | Haefner et al. ........ | 219/124.34 |
| 4,815,845 A | * | 3/1989 | Colbaugh et al. ............ | 356/153 |
| 4,831,316 A | * | 5/1989 | Ishiguro et al. ............. | 700/254 |
| 4,907,169 A | * | 3/1990 | Lovoi .......................... | 700/259 |
| 4,993,161 A | * | 2/1991 | Borkovitz ..................... | 33/291 |
| 5,297,238 A | * | 3/1994 | Wang et al. ................. | 700/259 |
| 5,341,458 A | * | 8/1994 | Kaneko et al. ............. | 700/245 |
| 5,357,598 A | * | 10/1994 | Ishihara et al. ............. | 700/245 |
| 5,798,627 A | * | 8/1998 | Gilliland et al. ........ | 318/568.14 |
| 5,906,761 A | * | 5/1999 | Gilliland et al. ........ | 219/124.34 |

OTHER PUBLICATIONS

Victor et al., The role of vision for underwater vehicles, 1994, IEEE, pp. 28–35.*

* cited by examiner

Primary Examiner—William A. Cuchlinski, Jr.
Assistant Examiner—Marc McDieunel
(74) Attorney, Agent, or Firm—Noreen C. Johnson; Christian G. Cabou

(57) ABSTRACT

A robotic machine includes a machine tool removably supported in a mount for following a programmable path over a workpiece. A calibration pointer includes a housing configured like the tool for being supported in the mount, and a laser is affixed in the housing for emitting a laser beam at the workpiece. In a method of operation, the laser beam is projected from the laser in a focused spot at the workpiece at an offset therefrom. The spot permits accurate programming of the machine without contacting the workpiece.

5 Claims, 4 Drawing Sheets

ROBOTIC LASER POINTER

BACKGROUND OF THE INVENTION

The present invention relates generally to robotic machine tools, and, more specifically, to calibration thereof.

Robotic machine tools exist in various configurations for performing various manufacturing operations in the production of various machine components. A typical machine tool is supported in a multi-axis machine for following a programmed path over the contours of a three dimensional workpiece. The workpiece may require precise machining of its surface contour to a specific shape, or may require welding at specific locations on the contour, or may require coating of its surface, for example.

In one exemplary configuration, a plasma torch or gun is mounted to the distal end of an articulated robotic arm having multiple degrees of movement such as translation or rotation or both. The machine may be programmed to aim the plasma gun toward the surface of the workpiece and follow a programmed path for automatically plasma spraying the workpiece with a suitable material.

For example, the workpiece may be a gas turbine engine stator vane having a complex 3-D contour requiring the deposition of a thermal barrier coating thereon by plasma spraying. In order to plasma spray a uniform coating over the entire surface of the workpiece, the plasma gun must follow a precise spraying path while maintaining a suitable offset or standoff from the surface of the workpiece.

The path program may be learned by the machine by manually repositioning the plasma gun from point-to-point around the surface of the workpiece while recording the corresponding position coordinates of the gun at each desired point in the path. The path is typically a rectangular grid of many discrete points at which the plasma gun may be aimed during the programmed sequence. Alternatively, the programmed path for the plasma gun may be analytically determined using the motion capabilities of the machine relative to the supported workpiece therein.

In either case, the machine must be suitably calibrated for ensuring accuracy of the programmed path relative to an individual workpiece. Even nominally identical workpieces are subject to manufacturing tolerances which affect the final dimensions thereof. Accordingly, it is typically desired to calibrate the machine for each part being handled to maximize the accuracy of the manufacturing process being applied thereto.

Robotic machine calibration is typically effected by using a rubber or spring contact pointer specifically configured for mounting to the robotic arm which permits the arm to follow the desired path so that the pointer may contact the workpiece without damage thereto. The pointer requires careful movement of the robotic arm as the pointer approaches the workpiece and withdraws therefrom to avoid contacting any adjacent portions of the workpiece which might be damaged thereby. This process is deliberate and slow and subject to inaccuracy as the pointer is compressed at its intended contact points. And, the contact between the pointer and workpiece may contaminate the workpiece.

For example, plasma spraying requires a clean workpiece which would be contaminated by pointer contact therewith. Calibration of the programmed path using the contact pointer necessarily requires an additional processing step to clean the workpiece after calibration and prior to plasma spraying.

Contact pointers thusly limit the speed at which at which robot program paths may be developed. They also limit the accuracy of machine tool position during the programmed path. They may also contaminate the workpiece on contact therewith, and may cause damage to the workpiece itself or the robotic machine when they inadvertently contact the workpiece during travel.

Accordingly, it is desired to provide a non-contact calibration pointer for a multi-axis machine tool for improving the calibration and manufacturing process.

BRIEF SUMMARY OF THE INVENTION

A robotic machine includes a machine tool removably supported in a mount for following a programmable path over a workpiece. A calibration pointer includes a housing configured like the tool for being supported in the mount, and a laser is affixed in the housing for emitting a laser beam at the workpiece. In a method of operation, the laser beam is projected from the laser in a focused spot at the workpiece at an offset therefrom. The spot permits accurate programming of the machine without contacting the workpiece.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
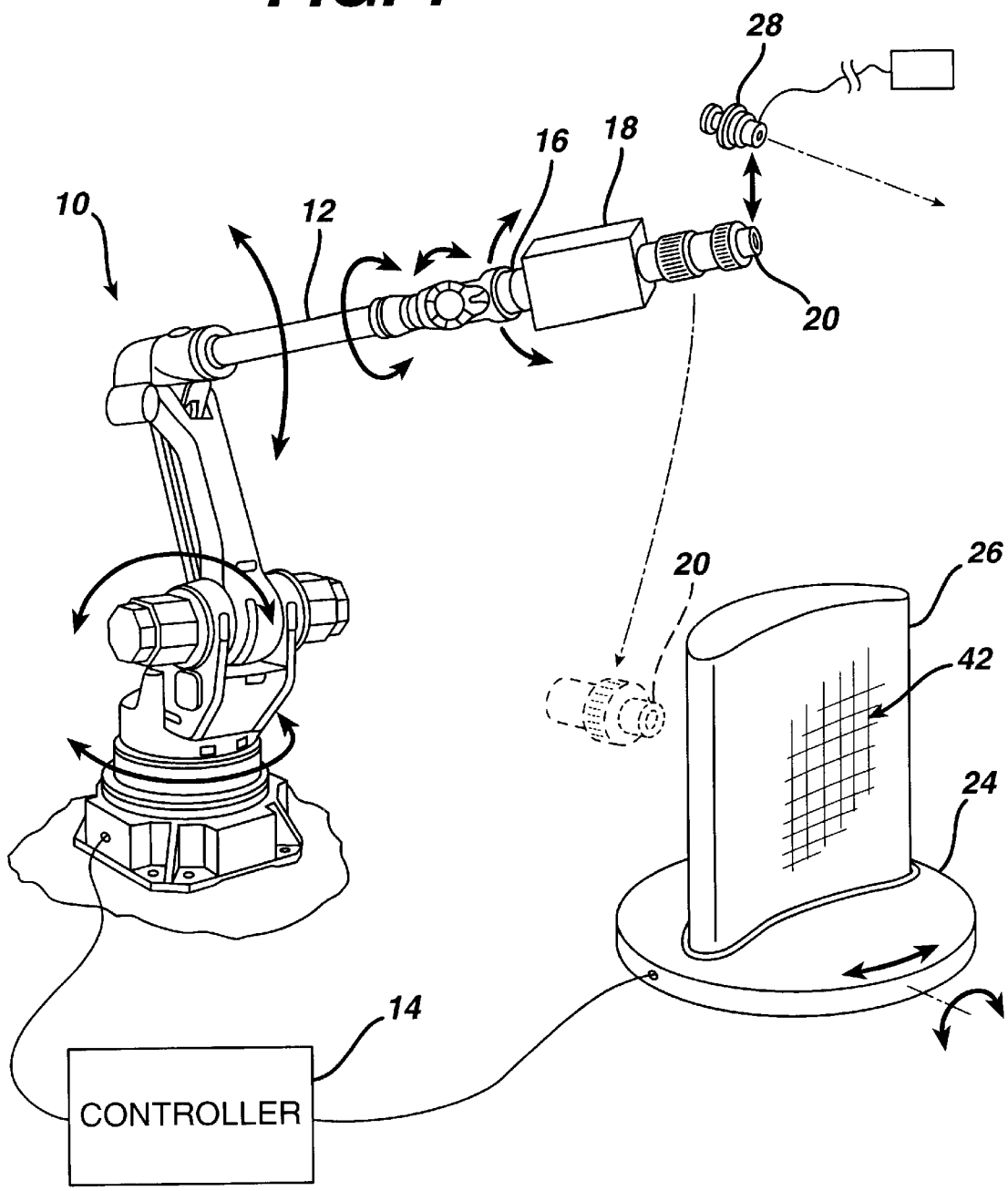
FIG. 1 is a schematic representation of a multi-axis machine tool configured for plasma spraying a workpiece in accordance with an exemplary embodiment of the present invention.

Illustrated schematically in FIG. 1 is a robotic machine 10 including a multi-axis articulated arm 12 whose position is operatively controlled by a programmable controller 14. The machine 10 may have any conventional configuration for performing various machining operations as desired including machining, welding, and plasma spraying, for example. Such machines are commonly referred to as computer numerical control (CNC) or digital numerical control (DNC) machines in which their various machining operations may be programmed in software, and stored in suitable memory within the controller for automatic operation thereof In the exemplary embodiment illustrated in FIG. 1, the robotic arm 12 is articulated at several joints to effect six axes of movement of a mount 16 disposed at the distal end of the arm. The corresponding six degrees of movement are all rotary as indicated by the six double headed arrows illustrated in FIG. 1.

A machine tool 18 in the exemplary form of a plasma spray gun is removably supported in the mount 16. The plasma gun includes a main body which is suitably water cooled, and removably mounts a plasma spray nozzle 20 thereto as illustrated in more detail in FIG. 2.

The plasma nozzle 20 is cylindrical and configured for being inserted into a corresponding barrel of the plasma gun, with a retaining nut 22 being used for threadingly securing the nozzle to the gun barrel. The nozzle includes suitable O-rings for providing a fluid seal with the barrel and sealing therein the water coolant circulated during operation for cooling the plasma gun.

Referring again to FIG. 1, the machine 10 also includes a mounting table 24 on which a workpiece 26 may be suitably mounted. In the exemplary embodiment, the mounting table introduces two additional degrees of movement including rotation of the table and tilting thereof which when combined with the six degrees of movement of the robotic arm 12 effect a total of eight degrees of movement between the arm and table. In this way, the plasma gun 18, and in particular its plasma nozzle 20, may be directed at any location over the exposed surface of the workpiece 26 mounted to the table 24.

The robotic multi-axis machine 10 described above and the workpiece 26 may have any conventional configuration. For example, the workpiece 26 is in the exemplary form of a gas turbine engine turbine vane which has an airfoil contour including a generally concave pressure side and a generally convex opposite suction side extending longitudinally from root to tip between leading and trailing edges of the vane.

Since the vane is subject to hot combustion gases during operation in a gas turbine engine, it is desired to coat the vane with a ceramic thermal barrier coating which is conventionally applied using plasma spray deposition effected by the plasma spray gun 18. The vane 26 is merely one of a substantial number of vanes required in a single gas turbine engine which may be plasma spray coated using the machine 10.

However, plasma spray coating of the vane requires precise orientation of the plasma nozzle 20 relative to the surface of the vane, and the nozzle must be precisely traversed over the entire surface of the vane for completing the spray coating thereof.

In order to more precisely program the controller 14 for the desired nozzle path over the workpiece, a calibration laser pointer 28 is provided in accordance with the present invention for use with the otherwise conventional robotic machine 10.

Figure 2:
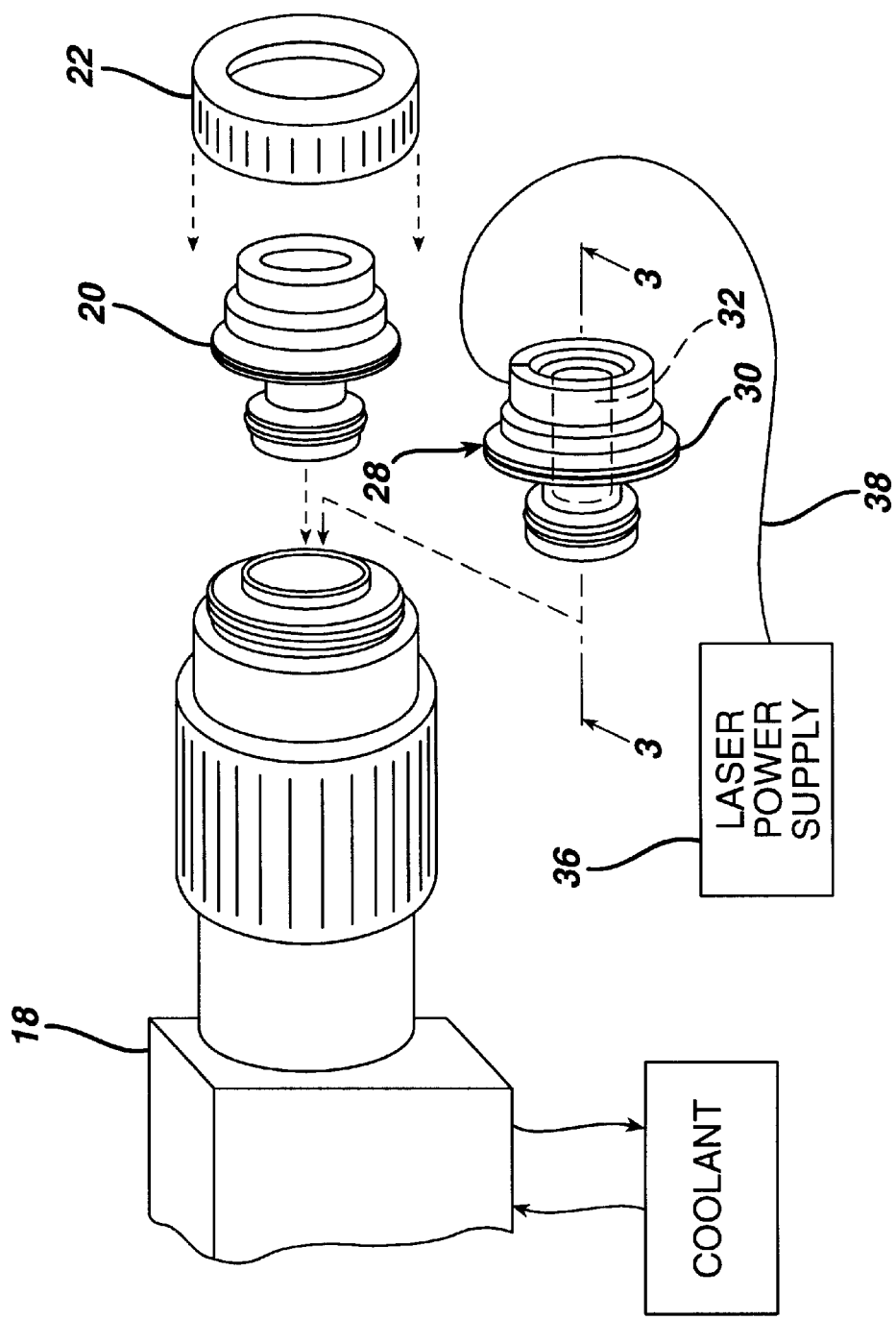
FIG. 2 is an enlarged and exploded view of the working end of the exemplary machine tool illustrated in FIG. 1, and an interchangeable calibration pointer therefor in accordance with an exemplary embodiment.
Figure 3:
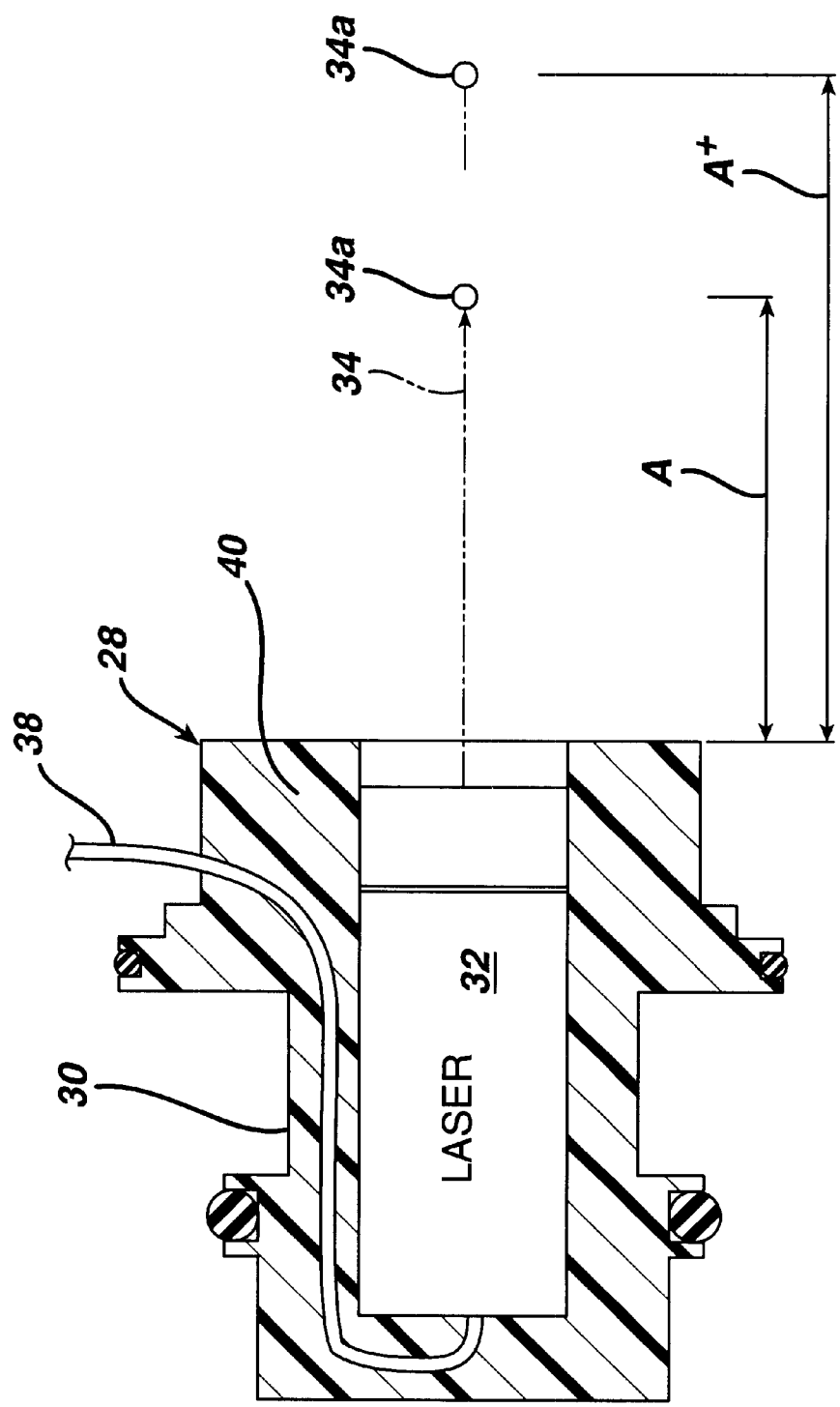
FIG. 3 is an axial sectional view through the calibration pointer illustrated in FIG. 2 and taken along line 3—3.

As shown in FIGS. 2 and 3, the laser pointer 28 includes a cylindrical housing 30 configured like the plasma nozzle 20, and is preferably initially identical thereto. In this way, the pointer housing 30 may be directly interchanged with the plasma nozzle 20 within the plasma gun barrel as an identical replacement, except that it is not configured for use as a plasma spray nozzle. Instead, a laser 32 is affixed in the pointer housing for emitting a laser beam 34 at the workpiece 26 as illustrated in more particularity in FIG. 4.

As illustrated in FIGS. 2 & 3, the laser 26 is preferably fixedly mounted inside the housing 30, and includes remote power supply 36 operatively joined to the laser by a suitable power line or cable 38. In this way, a conventional mini-laser may be mounted within the available space of a conventional plasma spray nozzle 20 with its power being provided remotely from the power supply 36, which may be battery operated with a manual on and off switch for energizing the laser when desired. The laser may have any conventional form such as a red diode laser for emitting a visible red laser beam.

Figure 4:
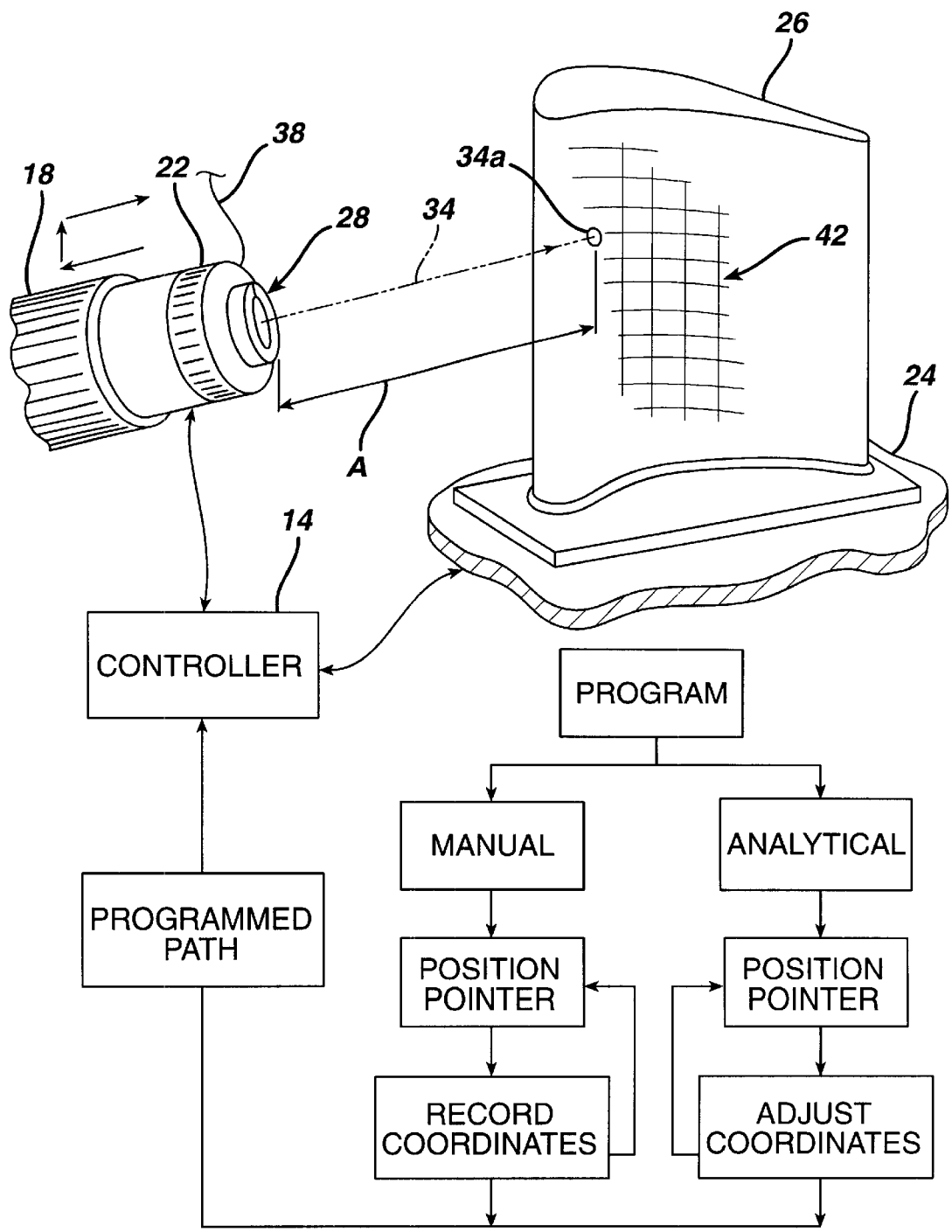
FIG. 4 is an enlarged view of the calibration pointer mounted in the robotic machine of FIG. 1 for calibration thereof in accordance with an exemplary method illustrated in flowchart form.

In the preferred embodiment illustrated in FIG. 3, the laser 32 includes an integral focusing lens having an adjustable focal length for focusing the laser beam 34 in a focused spot 34a viewable on the surface of the workpiece 26 as illustrated in FIG. 4. The adjustable focal length permits the focus spot to be generated at a predetermined offset or standoff A measured between the surface of the workpiece and the distal end of the pointer housing 30. FIG. 3 illustrates a nominal offset A for the focus spot 34a, and a slightly longer offset A+ with the corresponding location of the focus spot.

Accordingly, the laser 32 illustrated in FIG. 3 is preferably configured to emit a visible laser beam 34 for visually effecting the focused spot 34a. By mounting the laser 32 within the bore of the pointer housing 30, the laser beam 34 accurately reproduces the orientation of the plasma spray which would otherwise be emitted from the unmodified plasma spray nozzle used for creating the pointer housing.

The second plasma spray nozzle defining the pointer housing 30 is preferably axially split at one circumferential location as illustrated in FIGS. 2 and 3, and the bore of the housing is suitably machined as required for receiving the laser 32 in a suitably tight interference fit. The split housing introduces elasticity for tightly receiving the laser within the housing bore without damaging the laser itself. The inlet end of the pointer housing 30 and the axial split are preferably filled with a suitable sealant 40, such as silicone, for sealingly mounting the laser within the housing 30.

As indicated above, the advantage of using a second plasma spray nozzle, like the nozzle 20, for the pointer housing 30 is its almost identical configuration therewith for being mounted in the plasma gun barrel so that it may be suitably sealed within the barrel for containing the water coolant therein during operation. Like the original plasma nozzle 20, the pointer housing 30 includes suitable O-ring seals which seal the circumference of the housing to the gun barrel upon retention by the mounting nut 22 as illustrated in FIG. 2.

The laser pointer 28 is illustrated in FIG. 4 installed in the plasma gun 18 in an identical manner to the plasma nozzle 20 illustrated in FIG. 1 which it replaces. The combination of the laser pointer 28 and the robotic machine substantially improves the accuracy of calibrating the controller 14 illustrated schematically in FIG. 4, and substantially improves the speed of calibration. Since no part of the laser pointer 28 contacts the workpiece 26 during operation, contact contamination thereof is eliminated. And, since only the visible laser beam 34 is used to position the plasma gun relative to the workpiece 26, damage to the workpiece itself or to the robotic machine due to inadvertent contact therebetween is also eliminated.

FIG. 4 illustrates schematically and in flowchart form a preferred method of using the laser pointer 28 for calibrating the robotic machine. Initially, the laser pointer 28 is mounted into the plasma gun 18 of the machine in the same manner as the plasma spray nozzle 20 illustrated in FIG. 1 which it temporarily replaces. The machine may next be operated in a conventional manner to traverse or position the pointer 28 mounted to the robotic arm along any desired path which may be programmed in suitable software within the controller 14.

An exemplary form of the programmed path is represented by a rectangular grid path 42 having vertical and horizontal lines intersecting at corresponding grid points. The grid points may be used to map the entire exposed surface of the vane 26 requiring plasma spraying, and the programmed path for the laser pointer 28 represents the desired path of the corresponding plasma nozzle 20 for effecting the desired plasma spray process. The path programmed into the controller may have any suitable configuration which traverses the plasma spray gun from point-to-point around the surface of the vane 26.

The use of the laser pointer 28 in accordance with the present invention provides many benefits in improving the programmed path. The machine is initially operated to traverse the pointer 28 along a desired path on the workpiece, and the pointer is energized for projecting the laser beam 34 in its focused spot 34a at the workpiece. When compared with a conventional contact pointer, the laser pointer 28 makes it possible to view where the laser spot 34a appears on the workpiece surface without any physical contact between the pointer and the workpiece. The visual observation of the laser spot 34 itself permits accurate alignment of the plasma gun with the vane 26.

Furthermore, since a focused laser is used, an accurate determination of the desired offset A illustrated in FIG. 4 is also visually observed by observing whether or not the laser spot 34a is in focus on the surface of the workpiece. The laser pointer 28 will have the desired offset distance A from the spot 34a when the spot is viewed in focus on the workpiece with a precise and bright boundary. Confirmation of the desired offset A may be obtained by manually measuring the distance between the workpiece and distal end of the pointer 28 if desired.

The machine may be operated to reposition the plasma gun and the laser pointer 28 supported therein over the entire desired grid path 42 from point-to-point with the focused spot 34a being sequentially repositioned thereat with the corresponding offset distance A therefrom.

In this way, the robotic arm and laser pointer 28 mounted thereto may be sequentially re-positioned to effect the desired grid path 42 over the workpiece 26. The focus spot 34a is thusly re-positioned in turn over the plurality of discrete grid points represented by the desired path.

Depending upon the specific configuration of the workpiece 26 and whether or not there is potential for contact between the plasma gun and the workpiece during the programmed path, the laser pointer may be simply traversed laterally, or in and out relative to the surface of the workpiece. For example, FIG. 4 illustrates that the robotic arm may be re-positioned by withdrawing the laser pointer 28 outwardly away from the workpiece 26, followed in turn by moving the pointer laterally toward the next grid point, and then moving or extending the pointer 28 inwardly toward the workpiece to project the laser beam at the next desired grid point. In this way, the plasma spray gun is slightly withdrawn from near the workpiece as the workpiece and robotic arm are moved within their collective eight degrees of movement from point-to-point.

The laser pointer 28 illustrated in FIG. 4 permits the machine controller 14 to be programmed in any suitable manner with the advantages afforded by the referenced laser beam 34. For example, the programming path may be effected manually by initially providing the desired grid path 42 on the surface of the workpiece in any suitable manner such as by providing corresponding markings thereon. The robotic arm may then be actuated to manually aim the laser pointer 28 in turn at the grid points to effect a corresponding focused spot 34a thereat.

With the focused spot being at a desired grid point, and the spot being in focus, the orientation in space of the plasma gun relative to the workpiece is fixed, with a suitable offset A. The controller 14 may then be conventionally operated for recording the six coordinates of the robotic arm and the two coordinates of the mounting table which in turn identify the location in space of the laser pointer 28 relative to the workpiece at each of the desired grid points.

As shown in flowchart form in FIG. 4, manual programming of the controller is effected point-by-point by re-positioning the laser spot and recording the corresponding eight coordinates therefor. When all of the grid points have been illuminated by the focus spot 34a and the corresponding eight coordinates of the robotic arm and mounting table have been recorded in the controller, the programmed path is completed and stored therein.

After programming, the laser pointer 28 is removed from the gun barrel and replaced by the plasma nozzle 20. The robotic machine may then be operated in a conventional manner for plasma spraying the workpiece using the actual spray nozzle 20 which follows the programmed path created using the laser pointer 28. The speed of the plasma spraying operation over the programmed path may be substantially increased over the calibration speed as desired for maximizing that speed.

The controller 14 may alternatively be analytically programmed using the drawing specifications for the particular workpiece 26 and the movement capabilities of the robotic machine. The coordinates of the pointer 28 relative to the workpiece 26, as represented by its drawing dimensions, may be analytically determined at each of the desired grid points to effect the desired corresponding offsets A thereat. The analytically determined coordinates for the six degrees of movement of the robotic arm and the two degrees of movement of the mounting table 24 may be recorded or stored in the controller 14.

The machine may then be operated to follow the analytically determined path and sequentially project the laser beam spot 34a at the desired grid points atop an actual workpiece 26 mounted to the table 24.

Since manufacturing tolerances are associated with any workpiece, the actual relative position between the laser pointer 28 and an actual workpiece 26 mounted on the table 24 will include certain inaccuracies. However, by observing the focus spot 34a as it traverses the desired grid path on an actual workpiece 26, misalignments with the desired grid path may be readily observed, and any inaccurate offsets A which de-focus the spot 34a will also be readily observed.

The machine operator may then adjust the spot location at any one of the grid points by adjusting any one or more of the corresponding eight degrees of movement of the robotic arm and mounting table. Upon proper adjustment of the spot location at the corresponding grid point, the recorded coordinates in the controller 14 may be suitably corrected for thusly correcting the programmed path therein.

A particular advantage of the laser pointer 28 is its ability to precisely position the focused laser spot 34a at any location on the workpiece 26. For workpieces having local discontinuities or regions of rapidly changing contour, such as at fillet radii, the laser pointer permits precise location of the plasma gun with unobstructed viewing of the spot. The programmed path may be rapidly and precisely generated, not otherwise possible with a conventional contact pointer.

The laser pointer 28 when used in an otherwise conventional robotic machine can pinpoint any specific spot or desired travel path around a complex geometry using an adjustable focal length laser beam having a focused spot as small as about 0.5 mm. Such precision in robotic paths is critical in accurate welding and plasma spraying, but may also be used in other machining operations where desired. The laser pointer may be adapted for any type of removable machine tool for substitution thereof and calibrating any desired programmed path therefor.

Since robotic machines inherently possess coordinate measurement capability by recording the coordinates corresponding with their degrees of movement, the laser pointer may be additionally used with that coordinate measuring capability for additional advantage other than machining. For example, the machine may be operated using the laser pointer for precisely measuring various dimensions from point-to-point on a typical workpiece as desired.

Since rubber or spring contact pointers necessary require contact with the workpiece, the accurate determination of the tool offset from the workpiece is made difficult. Since the laser pointer does not contact the workpiece, it may be used for accurately measuring offset of the laser pointer itself, and correspondingly the otherwise identical plasma nozzle.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

What is claimed is:

1. A calibration pointer for a robotic machine having a machine tool removably supported in a mount for following a programmable path over a workpiece, comprising:

a housing configured like said tool for being supported in said mount;

a laser affixed inside said housing for emitting a laser beam at said workpiece wherein said laser has an adjustable focal length for focusing said laser bean in a focused spot at correspondingly different offsets from said housing; and a remote power supply operatively joined to said laser by a power cable.

2. A pointer according to claim 1 wherein:

said machine includes a multi-axis arm supporting at a distal end thereof said machine tool in the form of a plasma spray gun;

said gun includes a plasma spray nozzle mounted therein; and said pointer housing comprises a second plasma spray nozzle having said laser sealingly mounted therein.

3. A pointer according to claim 2 wherein said second nozzle is axially split for providing an interference fit with said laser mounted therein.

4. A pointer according to claim 2 wherein said laser is configured to emit a visible laser beam for visually effecting said focused spot.

5. A pointer according to claim 2 in combination with said robotic machine, and further comprising:

a programmable controller 14 operatively joined to said multi-axis arm for controlling position thereof; and a programmable controller 14 operatively joined to said multi-axis arm for controlling position thereof; and said controller is configured to include a programmed path for said pointer supported on said arm for maintaining an offset from said workpiece.

said controller is configured to include a programmed path for said pointer supported on said arm for maintaining an offset from said workpiece.

* * * * *